(12) United States Patent
Kumar et al.

(10) Patent No.: US 8,277,974 B2
(45) Date of Patent: Oct. 2, 2012

(54) HIGH ENERGY LITHIUM ION BATTERIES WITH PARTICULAR NEGATIVE ELECTRODE COMPOSITIONS

(75) Inventors: Sujeet Kumar, Newark, CA (US); James P. Buckley, San Jose, CA (US)

(73) Assignee: Envia Systems, Inc., Newark, CA (US)

( * ) Notice: Subject to any disclaimer, the term of this patent is extended or adjusted under 35 U.S.C. 154(b) by 480 days.

(21) Appl. No.: 12/429,438

(22) Filed: Apr. 24, 2009

(65) Prior Publication Data

US 2009/0305131 A1    Dec. 10, 2009

Related U.S. Application Data

(60) Provisional application No. 61/125,476, filed on Apr. 25, 2008, provisional application No. 61/113,445, filed on Nov. 11, 2008.

(51) Int. Cl.
*H01M 6/04* (2006.01)
*H01M 10/26* (2006.01)

(52) U.S. Cl. .................................................. 429/206
(58) Field of Classification Search .................. 429/206
See application file for complete search history.

(56) References Cited

U.S. PATENT DOCUMENTS

| | | | |
|---|---|---|---|
| 4,086,404 A | 4/1978 | Vissers et al. | |
| 4,957,543 A | 9/1990 | Babjak et al. | |
| 5,374,491 A | 12/1994 | Brannan et al. | |
| 5,738,907 A | 4/1998 | Vaccaro et al. | |
| RE35,818 E | 6/1998 | Tahara et al. | |
| 6,171,723 B1 | 1/2001 | Loch et al. | |
| 6,235,427 B1 | 5/2001 | Idota et al. | |
| 6,251,822 B1 | 6/2001 | Peng et al. | |
| 6,383,687 B1 | 5/2002 | Gibbons et al. | |
| 6,528,208 B1 | 3/2003 | Thackeray et al. | |
| 6,638,662 B2 | 10/2003 | Kaneda et al. | |
| 6,645,671 B2 | 11/2003 | Tsutsumi et al. | |
| 6,677,082 B2 | 1/2004 | Thackeray et al. | |

(Continued)

FOREIGN PATENT DOCUMENTS

EP            2079120 A2       7/2009

(Continued)

OTHER PUBLICATIONS

"Carbon-Silicon Core-Shell Nanowires as High Capacity Electrode for Lithium Ion Batteries," Li-Feng Cui et al. Nano Letters, 2009, vol. 9, No. 9, pp. 3370-3374 (cited on Applicants' Jul. 25, 2012, Information Disclosure Statement).*

(Continued)

*Primary Examiner* — Patricia L Hailey
(74) *Attorney, Agent, or Firm* — Dardi & Herbert, PLLC; Peter S. Dardi; Mengmeng Fahrni

(57) ABSTRACT

Combinations of materials are described in which high energy density active materials for negative electrodes of lithium ion batteries. In general, metal alloy/intermetallic compositions can provide the high energy density. These materials can have moderate volume changes upon cycling in a lithium ion battery. The volume changes can be accommodated with less degradation upon cycling through the combination with highly porous electrically conductive materials, such as highly porous carbon and/or foamed current collectors. Whether or not combined with a highly porous electrically conductive material, metal alloy/intermetallic compositions with an average particle size of no more than a micron can be advantageously used in the negative electrodes to improve cycling properties.

26 Claims, 1 Drawing Sheet

U.S. PATENT DOCUMENTS

| | | | |
|---|---|---|---|
| 6,680,143 B2 | 1/2004 | Thackeray et al. | |
| 6,699,336 B2 | 3/2004 | Turner et al. | |
| 6,730,429 B2 | 5/2004 | Thackeray et al. | |
| 6,749,648 B1 | 6/2004 | Kumar et al. | |
| 6,855,460 B2 | 2/2005 | Vaughey et al. | |
| 6,899,970 B1 | 5/2005 | Rogers et al. | |
| 6,979,513 B2 | 12/2005 | Kelley et al. | |
| 7,026,074 B2 | 4/2006 | Chen et al. | |
| 7,195,842 B1 | 3/2007 | Fujimoto et al. | |
| 7,205,072 B2 | 4/2007 | Kang et al. | |
| 7,229,717 B2 | 6/2007 | Yamaguchi et al. | |
| 7,235,330 B1 | 6/2007 | Fujimoto et al. | |
| 7,252,907 B2 | 8/2007 | Takeuchi et al. | |
| 7,273,682 B2 | 9/2007 | Park et al. | |
| 7,297,446 B2 | 11/2007 | Fukui et al. | |
| 7,432,015 B2 | 10/2008 | Jeong et al. | |
| 7,435,402 B2 | 10/2008 | Kang et al. | |
| 7,452,632 B2 | 11/2008 | Lee et al. | |
| 7,507,503 B2 | 3/2009 | Amine et al. | |
| 7,514,369 B2 | 4/2009 | Li et al. | |
| 7,517,614 B2 | 4/2009 | Jeong et al. | |
| 7,816,031 B2 | 10/2010 | Cui et al. | |
| 2001/0031396 A1 | 10/2001 | Tsutsumi et al. | |
| 2003/0157014 A1 | 8/2003 | Wang et al. | |
| 2003/0211390 A1 | 11/2003 | Dahn et al. | |
| 2004/0023117 A1 | 2/2004 | Imachi et al. | |
| 2004/0033419 A1 | 2/2004 | Funabiki | |
| 2004/0146734 A1* | 7/2004 | Miller et al. | 428/547 |
| 2004/0151951 A1 | 8/2004 | Hyung et al. | |
| 2004/0191630 A1 | 9/2004 | Kawamura et al. | |
| 2004/0241548 A1 | 12/2004 | Nakamoto et al. | |
| 2005/0019670 A1 | 1/2005 | Amine et al. | |
| 2005/0031942 A1 | 2/2005 | Hennige et al. | |
| 2005/0175901 A1* | 8/2005 | Kawakami et al. | 429/231.95 |
| 2005/0233213 A1 | 10/2005 | Lee et al. | |
| 2006/0040182 A1* | 2/2006 | Kawakami et al. | 429/218.1 |
| 2006/0051673 A1 | 3/2006 | Johnson et al. | |
| 2007/0148544 A1 | 6/2007 | Le | |
| 2007/0207381 A1 | 9/2007 | Ohtsuka et al. | |
| 2008/0113269 A1 | 5/2008 | Yamamoto et al. | |
| 2008/0131772 A1* | 6/2008 | Jambunathan et al. | 429/199 |
| 2008/0160265 A1 | 7/2008 | Hieslmair et al. | |
| 2009/0029256 A1 | 1/2009 | Mah et al. | |
| 2009/0053608 A1 | 2/2009 | Choi et al. | |
| 2009/0092899 A1 | 4/2009 | Treger | |
| 2009/0130562 A1 | 5/2009 | Mao et al. | |
| 2009/0186267 A1 | 7/2009 | Tiegs | |
| 2009/0263707 A1* | 10/2009 | Buckley et al. | 429/94 |
| 2009/0325061 A1 | 12/2009 | Lim | |
| 2010/0047671 A1* | 2/2010 | Chiang et al. | 429/50 |
| 2010/0086853 A1 | 4/2010 | Venkatachalam et al. | |
| 2010/0086854 A1 | 4/2010 | Kumar et al. | |
| 2010/0119942 A1 | 5/2010 | Kumar | |
| 2010/0151332 A1 | 6/2010 | Lopez et al. | |
| 2011/0017528 A1 | 1/2011 | Kumar et al. | |
| 2011/0052981 A1 | 3/2011 | Lopez et al. | |
| 2011/0052989 A1 | 3/2011 | Venkatachalam et al. | |
| 2011/0076556 A1 | 3/2011 | Karthikeyan et al. | |
| 2011/0111294 A1 | 5/2011 | Lopez et al. | |
| 2011/0111298 A1 | 5/2011 | Lopez et al. | |
| 2011/0136019 A1 | 6/2011 | Amiruddin et al. | |
| 2011/0244331 A1 | 10/2011 | Karthikeyan et al. | |
| 2012/0105007 A1 | 5/2012 | Amiruddin et al. | |
| 2012/0107680 A1 | 5/2012 | Amiruddin et al. | |

FOREIGN PATENT DOCUMENTS

| | | |
|---|---|---|
| EP | 2141759 A1 | 1/2010 |
| JP | 07-065825 | 8/1993 |
| KR | 1020040096381 A | 11/2004 |
| KR | 1020040100058 A | 12/2004 |
| KR | 10-0493960 B1 | 6/2005 |
| KR | 1020060087003 A | 8/2006 |
| KR | 1020060087183 A | 8/2006 |
| WO | 01/35473 A1 | 5/2001 |
| WO | 2005/011030 A1 | 2/2005 |
| WO | 2005/076389 A2 | 8/2005 |
| WO | 2006109930 A1 | 10/2006 |
| WO | 2007126257 A1 | 11/2007 |

OTHER PUBLICATIONS

"Electrochemical behaviors of silicon based anode material," Masaki Yoshio et al. Journal of Power Sources 146 (2005), pp. 10-14 (cited on Applicants' Jul. 5, 2012, Information Disclosure Statement).*

International Search Report and Written Opinion for PCT/US2009/002532 (US counter part application No. 12429438), dated Nov. 30, 2009.

Kumar, pending patent application serial No. 12/502,609, "Composite Compositions, Negative Electrodes With Composite Compositions and Corresponding Batteries," filed Jul. 14, 2009.

Lopez et al., pending U.S. Appl. No. 12/332,735, "Positive Electrode Materials for High Discharge Capacity Lithium Ion Batteries," filed Dec. 11, 2008.

Venkatachalam et al., pending U.S. Appl. No. 12/246,814, "Positive Electrode materials for Lithium Ion Batteries Having a High Specific Discharge Capacity and Processes for the Synthesis of These Materials," filed Oct. 7, 2008.

Chan et al., "High-performance lithium battery anodes using silicon nanowires," Nature Nanotechnology Jan. 2008, vol. 3, pp. 31-35.

Chen et al., "Electrochemical Insertion/extraction of Lithium in Multiwall Carbon Nanotube/Sb and SnSb0.5 Nanocomposites," published by the Massachusetts Institute of Technology, division of Molecular Engineering of Biological and Chemical Systems, Dec. 2003.

Kang et al., "Enchanting the rate capability of high capacity xLi2MnO3 . (1-x)LiMO2 (M=Mn, Ni, Co) electrodes by Li-Ni-PO4 treatment," Electrochemistry Communications 11 (2009) 748-751.

Kang et al., Layered Li(Li0.2Ni0.15+0.5zCo0.10Mn0.55-0.5z)o2-zFz cathode materials for Li-ion secondary batteries, Journal of Power Sources 146 (2005) 654-657.

Kim et al., Synthesis of spherical Li{ni(1/3-z)Co(1/3-z)Mn(1/3-z)MgzO2 as positive electrode material for lithium ion battery, Electrchemica Acta 51 (2006)2447-2453.

Kim et al., Improvement of High-Voltage Cycling Behavior of Surface Modified Li[Ni1/3Co1/3Mn1/3]o2 Cathodes by Fluorine Sustitution for Li-Ion Batteries, Journal of the Electrochemical Society 152 (9) A1701-A1713 (2005).

Lee et al., "High capacity Li[Li0.2Ni0.2Mn0.6]O2 cathode materials via a carbonate co-precipitation method," J. of Power Sources, 162 (2006), 1346-1350.

Liu et al., "Electrical transport in doped mulitwalled carbon nanotubes," Physical Review B, vol. 63,161404(R), pp. 1-4 (2001).

Schoenenberger et al., 2009 "Multiwall carbon nanotubes," http://physicsworld.com/cws/article/print/606.

Shi et al., "Nano-SnSb alloy deposited on MCMB as an anode material for lithium ion batteries," J. Materials Chemistry vol. 11(5) pp. 1502-1505 (2001).

Sun et al., "AlF3-Coating to Improve High Voltage Cycling Performance of Li[Ni1/3Co1/3Mn1/3]O2 Cathode Materials for Lithium Secondary Batteries," J. of the Electrochemical Society, 154 (3), A168-A172 (2007).

Sun et al., "Significant Improvement of high voltage cycling behavior AlF3-coated LiCoO2 cathode," Electrochemistry Communications 8 (2006) 821-826.

Thackeray et al., "Comments on the structural complexity of lithium-rich Li1+xM1–xO2 electrodes (M=Mn,Ni,Co) for lithium batteries," Electrochemistry Communications 8 (2006), 1531-1538.

Woo et al., "Significant Improvement of Electrochemical Performance of AlF3-Coated Li[Ni0.8Co0.1Mn0.1]O2 Cathode Materials," J. of the Electrochemical Society, 154 (11) A1005-A1009 (2007).

Choi et al., "Effect of fluoroethylene carbonate additive on interfacial properties of silicon thin-film electrode" Journal of Power Sources 161 (2006) 1254-1259. (Abstract only).

Liu et al., "Improvement of cycling stability of Si anode by mechanochemical reduction and carbon coating" Journal of Power Sources 189 (2009) 480-484.

Yoshio et al., "Electrochemical behaviors of silicon based anode material" Journal of Power Sources 146 (2005) 10-14. (See abstract).

Amiruddin et al., pending U.S. Appl. No. 12/938,073, "Lithium Ion Batteries with Supplemental Lithium", filed Nov. 2, 2010.

Cui et al, "Carbon-silicon core-shell nanowires as high capacity electrode for lithium ion batteries," Nano Lett. 9 (9):3370-3374 (2009) (Abstract only).

Yoshio et al, "Electrochemical behaviors of silicon based anode material," Journal of Power Sources 146:10-14 (2005) (Abstract).

* cited by examiner

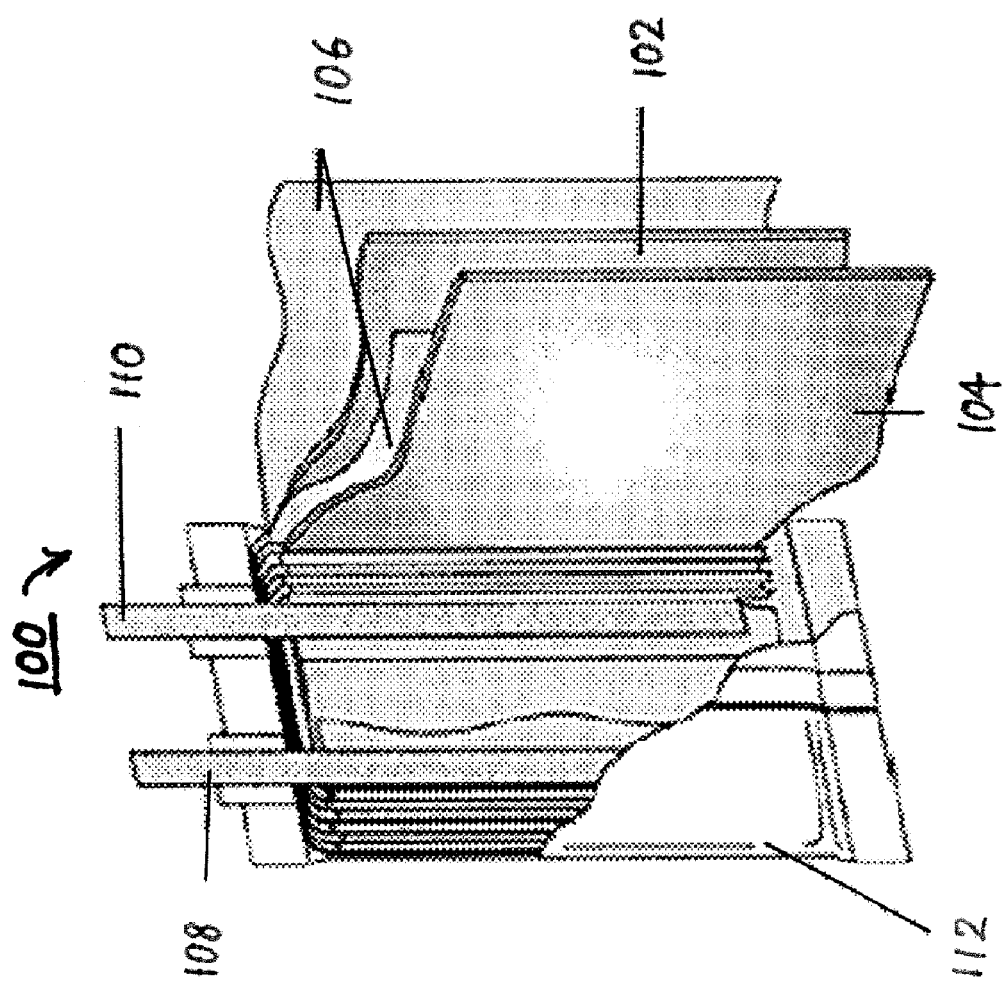

HIGH ENERGY LITHIUM ION BATTERIES WITH PARTICULAR NEGATIVE ELECTRODE COMPOSITIONS

CROSS REFERENCE TO RELATED APPLICATIONS

This patent application claims priority to copending U.S. provisional patent application Ser. No. 61/125,476 filed on Apr. 25, 2008 to Kumar et al., entitled "Lithium Ion Batteries with Particular Negative Electrode Compositions" and Ser. No. 61/113,445 filed Nov. 11, 2008 to Kumar, entitled "Intermetallic Compositions, Negative electrodes with Intermetallic Compositions and Batteries", both incorporated herein by reference.

FIELD OF THE INVENTION

The inventions, in general, are related to negative electrodes with desirable active compositions for lithium ion batteries. The inventions are further related to high energy density negative electrode compositions and high energy lithium ion batteries constructed from the high energy density negative electrode compositions, as well as corresponding methods.

BACKGROUND

Lithium batteries are widely used in consumer electronics industry due to their high energy density. For some current commercial batteries, the negative electrode material can be graphite, and the positive electrode materials can comprise lithium cobalt oxide ($LiCoO_2$), lithium manganese oxide ($LiMn_2O_4$), lithium nickel oxide ($LiNiO_2$), lithium nickel cobalt oxide ($LiNiCoO_2$), lithium nickel cobalt manganese oxide ($LiNiMnCoO_2$), lithium nickel cobalt aluminum oxide ($LiNiCoAlO_2$) and the like. For negative electrodes, lithium titanate is an alternative to graphite with good cycling properties, but it has a lower energy density. Other alternatives to graphite, such as tin oxide and silicon, have the potential for providing increased energy density. However, these other alternatives for negative electrode materials have been found to be unsuitable commercially due to poor discharge and recharge cycling related to structural changes and anomalously large volume expansions, especially for silicon, that are associated with lithium intercalation/alloying. The structural changes and large volume changes can destroy the structural integrity of the electrode, thereby decreasing the cycling efficiency.

SUMMARY OF THE INVENTION

In a first aspect, the invention pertains to a lithium ion battery comprising a positive electrode, a negative electrode, a separator between the positive electrode and the negative electrode and an electrolyte comprising lithium ions. The negative electrode of the lithium ion battery comprises a foamed current collector impregnated with an active material comprising a metal alloy/intermetallic material. The negative electrode of the battery generally lacks a foil current collector or a grid current collector separate from the foamed current collector. In some embodiments, the foamed current collector of the negative electrode of the battery comprises carbon, nickel, titanium, aluminum, stainless steel, or a combination thereof.

The metal alloy/intermetallic in the negative electrode of the battery can be particles having an average particle size of no more than 1 micron. Additionally, the negative electrode of the lithium ion battery can further comprise a polymer binder, which can be effective to hold the metal alloy/intermetallic particles within the electrode. In some embodiments, the metal alloy/intermetallic material comprises a tin-copper alloy or an alloy of copper tin and one or more additional metals or combination thereof. In some embodiments, the metal alloy/intermetallic material comprises a composition having a formula $Si_xSn_qM_yC_z$, where $(q+x)>2y+z$, $q>=0$, $z>=0$ and M is a metal selected from manganese, molybdenum, niobium, tungsten, tantalum, iron, copper, titanium, vanadium, chromium, nickel, cobalt, zirconium, yttrium and combinations thereof having at least about 40 weight percent and about 80 atomic percent Si as an amorphous Si phase, a nanocrystalline metal silicide phase, a silicon carbide phase when $z>0$, and an amorphous Sn phase when $q>0$. In some embodiments, the metal alloy/intermetallic material comprises a composition having a formula Sn-E-M, where E is boron (B), carbon (C), aluminum (Al), phosphorous (P) or a combination thereof ranging from 9.8 weight percent to 49 weight percent, and M is a metal selected from silicon, magnesium, titanium, vanadium, chromium, manganese, iron, cobalt, nickel, copper, zinc, gallium, zirconium, niobium, molybdenum, silver, indium, cerium, hafnium, tantalum, tungsten, bismuth and combinations thereof.

The positive electrode of the lithium ion battery comprises an electroactive material having a discharge capacity at a 10th discharge cycle of at least 240 mAh/g at room temperature at a discharge rate of C/3 when discharged from 4.6 volts to 2.0 volts. In some embodiments, the positive electrode comprises an electroactive material having a $10^{th}$ cycle specific discharge capacity of at least 235 mAh/g at room temperature and a tap density of at least 1.8 g/mL, wherein the specific discharge capacity is determined at a discharge rate of C/3 when discharged from 4.6 volts to 2.0 volts.

In another aspect, the invention pertains to a lithium ion battery wherein the negative electrode of the lithium ion battery comprises distinct metal and/or metal alloy/intermetallic particles and porous carbon particles having a Brunauer-Emmett-Teller (BET) surface area of at least about 250 $m^2$/g. In some embodiments, the porous carbon particles of the negative electrode of the lithium ion battery has a BET surface area from about 255 to about 500 $m^2$/g. The porous carbon particles can comprise activated carbon, mesoporous carbon, or combination thereof. In some embodiments, the metal and/or metal alloy powder has an average particle size of no more than 1 micron.

In yet another aspect, the invention pertains to a lithium ion battery wherein the negative electrode of the lithium ion battery comprises metal alloy/intermetallic particles and lithium titanate particles, wherein the metal alloy particles and the lithium titanate particles each have an average particle size of no more than 1 micron. In some embodiments, the collection of metal alloy/intermetallic particles and the collection of lithium titanate particles can each have an average particle size of no more than 250 nm. In some embodiments, the lithium titanate comprises from about 1 weight percent to about 45 weight percent relative to the combined weight of the meta/metal alloy and the lithium titanate.

In a further aspect, the invention pertains a powder comprising amorphous metal alloy/intermetallic particles wherein the particles have an average particle size of no more than about 1 micron. In some embodiments, the powder comprises metal/metal alloy particles and a lithium titanate particles, each having an average particle size of no more than 1 micron. In some embodiments, the metal alloy/intermetallic particles can have an average particle size of no more than 250 nm. In some embodiments, the metal alloy/intermetallic particles can comprise a tin-copper alloy or an alloy of copper tin and one or more additional metals or combination thereof. In some other embodiments, the metal alloy/intermetallic particles comprises a composition having a formula $Si_xSn_qM_yC_z$, where $(q+x) > 2y+z$, $q \geq 0$, $z \geq 0$ and M is a metal selected from manganese, molybdenum, niobium, tungsten, tantalum, iron, copper, titanium, vanadium, chromium, nickel, cobalt, zirconium, yttrium and combinations thereof having at least about 40 weight percent and about 80 atomic percent Si as an amorphous Si phase, a nanocrystalline metal silicide phase, a silicon carbide phase when $z>0$, and an amorphous Sn phase when $q>0$. In some embodiments, wherein the metal alloy/intermetallic composition comprises a composition having a formula Sn-E-M, where E is boron (B), carbon (C), aluminum (Al), phosphorous (P) or a combination thereof ranging from 9.8 weight percent to 49 weight percent, and M is a metal selected from silicon, magnesium, titanium, vanadium, chromium, manganese, iron, cobalt, nickel, copper, zinc, gallium, zirconium, niobium, molybdenum, silver, indium, cerium, hafnium, tantalum, tungsten, bismuth and combinations thereof.

In a further aspect, the invention pertains to a method for forming a metal alloy/intermetallic composition having a reduced degree of crystallinity, the method comprising milling amorphous elemental powders to form the alloy composition. In some embodiments, the metal alloy/intermetallic composition comprises tin. The amorphous metal alloy/intermetallic powders can have an average particle size of no more than about 1 micron.

BRIEF DESCRIPTION OF THE DRAWINGS

FIG. 1 is a schematic diagram of a pouch cell battery in accordance with an exemplary embodiment.

DETAILED DESCRIPTION OF PREFERRED EMBODIMENTS

Improved anode structures described herein can take advantage of synergies between various combinations of materials. For example, foamed metal or carbon elements can be used as current collectors with a negative electrode active composition that comprises a metal alloy/intermetallic composition. Foamed metal or foamed carbon can be formed with appropriate mechanical strength. When used with metal alloy/intermetallic active material, the resulting electrode structure has appropriate electrical conductivity such that a traditional metal foil current collector may not be incorporated into the structure. Furthermore, a negative electrode active material with better cycling can comprise porous high surface area carbon combined with a metal and/or a metal alloy/intermetallic active material. The pores of the carbon particles can absorb at least a portion of the volume change of the negative electrode active material as the active material alloys/intermetallic with lithium or releases lithium. In some embodiments, metal alloy/intermetallic particles with a submicron average particle diameter, such as amorphous particles, can be incorporated into the negative electrode to improve cycling properties while exploiting a high energy density whether or not combined with a highly porous conductive material. Furthermore, composite particles with an alloy/intermetallic composition associated with submicron carbon particles or carbon fibers can provide desirable performance. Additionally or alternatively, a combination of submicron metal alloy/intermetallic and submicron lithium titanate as a negative electrode material can have improved cycling properties with reduced overall volume changes upon cycling of the secondary battery. The combinations of the materials can be particularly desirable with active particles having an average particle size of no more than about 1 micron.

The resulting negative electrode can have a desirable high energy density due to the chemical properties of the metal and/or metal alloy/intermetallic active materials. Generally, due to the ability to absorb the volume changes of the active materials, the negative electrodes can have improved cycling properties. In some embodiments, desirable cycling can result from the presence of the lithium titanate, and the cycling is expected to be further improved with blends of active materials through a submicron average particle size of the lithium titanate as well as metal alloy/intermetallic materials. With an average particle size of no more than a micron, the particles may undergo smaller relative volume changes as well as improved contact between the two materials. These synergistic combinations of materials for the negative electrode are well suited for incorporation into high energy secondary lithium ion batteries.

In some embodiments, the negative electrode active material generally comprises a metal, a intermetallic composition and/or a metal alloy active material, in which silicon is considered a metal for convenience although silicon can be described as a semi-metal or metalloid. Intermetallic compositions are solid materials with two or more metal or metalloid elements with a structure that differs discontinuously with respect to the structure of the constituent metals or metalloids. Intermetallic compositions can optionally comprise non-metal atoms. Alloys refer to metallic compositions that are homogenous mixtures with mixtures of metal atoms or one or more metal elements with one or more non-metal elements. While many alloys have a plurality of metal elements, some alloys are alloys of a metal with a relatively low amount of a non-metal additive, such as steel which is iron with a low amount of carbon additive, which results in a homogenous metallic composition. Alloy(s)/intermetallic(s) refers to compositions that are alloys and/or intermetallic compositions.

Silicon itself can function as an active material for a negative electrode, and elemental silicon can be used in some of the material composites described herein, although silicon undergoes extremely large volume changes when cycled in a lithium negative electrode. Similarly, other metals can alloy with lithium, such as tin and aluminum such that these metals can also be used in negative electrodes. During cycling, the metals take up lithium such that the metals effectively alloys with lithium during the cell cycling after an initial charging of the cell. Additional metal alloys/intermetallics are described herein that can be effectively used in the negative electrode structures. As these metal alloy/intermetallic materials take up lithium into their structure, the process can be more accurately described as an alloying process rather than an intercalation process, which generally takes place for metal oxides or the like. However, there is no desire to be bound by theory, and when the terms alloying and intercalation are used herein, these terms are intended to be interpreted in context as the appropriate physical process corresponding to the reduction/oxidation reaction taking place with a corresponding change in the material regardless of any arguments associated with the preciseness of the terminology.

Lithium has been used in both primary and secondary batteries. An attractive feature of lithium metal is its light weight and the fact that it is the most electropositive metal, and aspects of these features can be advantageously captured in lithium ion batteries also. Certain forms of metals, metal oxides, and carbon materials are known to incorporate lithium ions into their structure through intercalation or similar mechanisms. Lithium ion batteries refer to batteries in which the negative electrode active material is also a lithium intercalation material or, as described herein, a lithium alloying material. If lithium metal itself is used as the anode or negative electroactive material, the resulting battery generally is simply referred to as a lithium battery. Significant improvements in energy density of cathode active materials are reported in copending patent application Ser. No. 12/246,814 to Venkatachalam et al. filed Oct. 7, 2008 entitled "Positive Electrode Materials for Lithium Ion Batteries Having a High Specific Discharge Capacity and Processes for the Synthesis of these Materials", and copending patent application Ser. No. 12/332,735 to Lopez et al. filed Dec. 11, 2008 entitled "Positive Electrode Materials for High Discharge Capacity Lithium Ion Batteries", both of which are incorporated herein by reference. These cathode active materials with improved energy density have been used to construct high energy lithium ion secondary batteries such as those described in copending patent application Ser. No. 12/403,521 to Buckley et al. filed Mar. 13, 2009 entitled "High Energy Lithium Ion Secondary Batteries", incorporated herein by reference.

To accommodate the increased energy density of the cathode active material and high energy density positive electrode constructed from these materials, negative electrodes can be produced that also have high energy density. In some embodiments, improved anode structures described herein take advantage of synergies between various combinations of materials. Specifically, high energy density negative electrode materials generally undergo significant volume changes. The synergistic material combinations described herein are designed to accommodate some volume changes without leading to undesirably large degradation of the battery performance over cycling of the battery over a significant number of cycles. In particular, foamed current collectors as well as highly porous carbon particles have pores that can accommodate the active particles while providing protected space for reasonable volume changes of the active material are used.

As described herein, the metal alloy/intermetallic materials can be formed as particles with an average particle size of no more than a micron. In some embodiments, the submicron metal alloy/intermetallic particles can be amorphous, which may improve the cycling properties of the particles. The resulting active particles provide distinct advantages whether or not combined into the synergistic structures described herein. Due to the high surface area of the submicron particles, the packing of the particles may accommodate the volume changes with less disruption of the structure. Furthermore, the particles may adjust to the volume changes with less irreversible changes to the particle due to the smaller volume of the particles. In addition, the submicron particles can be more easily packed into the pores of either foamed conductive current collectors or highly porous carbon particles. Due to this improved packing, the synergistic materials described herein can be formed with improved properties.

Similarly, metal alloy/intermetallic materials can be formed in association with submicron carbon particles. Elemental carbon, $C^0$, is known in several forms having a submicron particle size. For example, carbon black with a high surface area is available, and carbon nanotubes have diameters generally on the range of a few nanometers. As used herein, submicron carbon materials refer to particles with an average particle diameter of no more than a micron and to fibers having a cross sectional radius of no more than a micron. Suitable nanotubes can be single wall nanotubes, multiwall nanotubes or mixtures thereof. In particular, the metal alloy/intermetallic composition can be formed as a coating on the carbon particles or as submicron alloy/intermetallic particles bound to or otherwise associated with the carbon particles. As one example, the metal alloy/intermetallic can be formed by milling elemental metal particles in association with the carbon particles. Since the carbon particles are mechanically stronger than the malleable metal, the metal alloys/intermetallics as a coating onto the carbon particles during the milling process. Furthermore, it can be desirable for the metal alloy/intermetallic to be amorphous, and a milling process to form the metal alloy/intermetallic in association with the carbon particles generally promotes the formation of an amorphous alloy/intermetallic. The formation of $Sn_2Sb$ alloy on multiwalled carbon nanotubes with a reduction reaction is described in an article by Chen et al., entitled "Electrochemical Insertion/extraction of Lithium in Multiwall Carbon Nanotube/Sb and $SnSb_{0.5}$ Nanocomposites," published by the Massachusetts Institute of Technology, division of Molecular Engineering of Biological and Chemical Systems, evidently in December 2003, incorporated herein by reference.

In some embodiments, amorphous alloy/intermetallic particles can be formed, which can also be effectively incorporated into the composite materials described herein with electrically conductive highly porous support structures. The amorphous material is expected to have desirable cycling properties in the negative electrode. Also, the metal alloy/intermetallic particles can have an average particle size of no more than a micron. The amorphous metal alloy/intermetallic particles can be formed by milling amorphous metal particles. The milling process can substantially maintain the amorphous character as the alloy/intermetallic composition is formed.

The composite materials described herein can provide the exploitation of higher energy density negative electrode materials. These negative electrode structures are particularly desirable for use in lithium ion cells that also incorporate high energy density positive electrode active materials. Specifically, the capacity of the positive electrode and negative electrode can be relatively balanced, generally with a slight excess negative electrode capacity to reduce the risk of lithium metal depositing during recharging of the battery. Thus, if a high energy density positive electrode active material is used, the incorporation of a high energy density negative electrode active material provides for better balance of the positive electrode and negative electrode with respect to thickness and other parameters, which may lead to better cell performance.

Lithium Ion Batteries

The batteries described herein generally are lithium ion batteries in which generally a non-aqueous electrolyte comprises lithium ions. For secondary lithium ion batteries, lithium ions are released from the negative electrode during discharge such that the negative electrode functions as an anode during discharge with the generation of electrons from the oxidation of lithium upon its release from the electrode. Correspondingly, the positive electrode takes up lithium ions through intercalation or the like during discharge such that the positive electrode functions as a cathode which neutralizes the lithium ions with the consumption of electrons. Upon recharging of the secondary cell, the flow of lithium ions is reversed through the cell with the negative electrode taking up lithium and with the positive electrode releasing lithium as lithium ions. Rechargeable batteries have a range of uses, such as mobile communication devices, such as phones, mobile entertainment devices, such as MP3 players and televisions, portable computers, combinations of these devices that are finding wide use, as well as transportation devices, such as automobiles and fork lifts.

The negative electrodes described herein can be incorporated into various commercial battery cell designs. While the negative electrode can be used in batteries for primary, or single charge use, the resulting batteries generally have desirable cycling properties for secondary battery use over multiple cycling of the cells. The battery cells can comprise a single negative electrode structure or a plurality of negative electrode structures assembled in parallel and/or series electrical connection(s). For example, the electrodes described herein can be stacked with the separator between them, and the resulting stacked structure can be rolled into a cylindrical, prismatic, or other reasonable configuration to form the battery structure. Appropriate electrically conductive tabs can be welded or the like to the current collectors, and the resulting jellyroll or stacked structure can be placed into a metal canister or polymer package, which can be flexible, with the negative tab and positive tab welded to appropriate external contacts. Electrolyte is added to the canister or package, and the canister or package is sealed to complete the battery. A presently widely used commercial cell is the cylindrical 18650 cell (18 mm in diameter and 65 mm long), although other cell sizes can be used. An example of a pouch cell battery is illustrated schematically in FIG. 1 with a laminated film case.

Positive Electrode Active Material and Positive Electrode

In general, the positive electrode comprises a particulate composition that intercalates lithium ions during discharge of the battery. The positive electrode can comprise a binder to contribute to the integrity of the electrode. The positive electrode can further comprise electrically conductive particles, such as graphite particles, graphite or carbon fibers, carbon fibrils, carbon whiskers, carbon black, silver particles or the like to improve electrical conduction in the electrode. Suitable active compositions for the positive electrode include, for example, lithium cobalt oxide, lithium nickel oxide, lithium manganese oxide and the like.

However, the negative electrode designs described herein are intended to introduce high energy density materials into the negative electrode. Thus, it can be advantageous to have high energy density positive electrode active materials in combination with the improved negative electrode structures described herein. It has been found that positive electroactive materials with a high energy density can be prepared with suitable properties, for example, tap density, such that the powders can be effectively assembled into batteries that have correspondingly high energies. A class of desirable high energy density positive electrode active compositions are believed to have a composite crystal structure in which, for example, a $Li_2MnO_3$ is structurally integrated with either a layered $LiMnO_2$ component or a spinel $LiMn_2O_4$ component or similar composite compositions with the manganese ions substituted with other transition metal ions with equivalent oxidation states. In some embodiments, the positive electrode material can be represented in two component notation as $xLiMO_2 \cdot (1-x) Li_2M'O_3$ where M is one or more of trivalent metal ions with at least one ion being $Mn^{+3}$, $Co^{+3}$, or $Ni^{+3}$ and where M' is one or more tetravalent metal ions and $0<x<1$. These compositions are described further in U.S. Pat. No. 6,677,082 to Thackeray et al. (the '082 patent), entitled "Lithium Metal Oxide Electrodes for Lithium Cells and Batteries" and U.S. Pat. No. 6,680,143 to Thackeray et al. (the '143 patent), entitled "Lithium Metal Oxide Electrodes for Lithium Cells and Batteries," both of which are incorporated herein by reference. Thackery identified Mn, Ti and Zr as being of particular interest as M' and Mn and Ni for M. In other embodiments, the layered lithium rich compositions can be represented in two component notation as $x Li_2MnO_3 \cdot (1-x)LiMn_{2-y}M_yO_4$, where M is one or more metal cations. These compositions are described further in published U.S. patent application 2006/0051673 to Johnson et al., entitled "Manganese Oxide Composite Electrodes for Lithium Batteries," incorporated herein by reference.

It has also been found that metal and fluorine dopants can influence the capacity, impedance and cycling stability of the layered lithium metal oxide structures. These compositions with suitable metal and fluorine dopants can similarly be used in the batteries described herein. Some embodiments of these metal and halogen atom doped, e.g., fluorine doped, compositions are described further in U.S. Pat. No. 7,205,072 to Kang et al., entitled "Layered Cathode Materials for Lithium Ion Rechargeable Batteries," incorporated herein by reference. Positive electrode active materials with an optional fluorine dopant can be described by the formula $Li_{1+x}Ni_\alpha Mn_\beta Co_\gamma M_\delta O_{2-z/2}F_z$, where x ranges from about 0.05 to about 0.25, α ranges from about 0.1 to about 0.4, β range from about 0.4 to about 0.65, γ ranges from about 0.05 to about 0.3, δ ranges from about 0 to about 0.1 and z ranges from about 0 to about 0.1, and where M is Mg, Zn, Al, Ga, B, Zr, Ti, Ca, Ce, Y, Nb or combinations thereof. In embodiments in which z=0, this formula reduces to $Li_{1+x}Ni_\alpha Mn_\beta Co_\gamma M_\delta O_2$.

It has been found that suitable coatings provide desirable improvements in cycling properties without the use of a fluorine dopant, although it may be desirable to have a fluorine dopant in some embodiments. Furthermore, in some embodiments it is desirable to have δ=0 such that the compositions are simpler while still providing improved performance. For these embodiments, if z=0 also, the formula simplifies to $Li_{1+x}Ni_\alpha Mn_\beta Co_\gamma O_2$, with the parameters outlined above. Compositions represented with the $Li_{1+x}Ni_\alpha Mn_\beta Co_\gamma O_2$ can be alternatively written in the two component notation referenced above. A person of ordinary skill in the art will recognize that additional ranges of parameter values for the compositions within the explicit ranges above are contemplated and are within the present disclosure.

Appropriate coating materials can both improve the long term cycling performance of the material as well as decrease the first cycle irreversible capacity loss. While not wanting to be limited by theory, the coatings may stabilize the crystal lattice during the uptake and release of lithium ions so that irreversible changes in the crystal lattice are reduced significantly. In particular, metal fluoride compositions can be used as effective coatings. The general use of metal fluoride compositions as coatings for cathode active materials, specifically $LiCoO_2$ and $LiMn_2O_4$, is described in published PCT application WO 2006/109930A to Sun et al. (the '930 application), entitled "Cathode Active Material Coated with Fluorine Compound for Lithium Secondary Batteries and Method for Preparing the Same," incorporated herein by reference.

High specific capacities were obtained for $Li_{1+x}Ni_\alpha Mn_\beta Co_\gamma M_\delta O_{2-z/2}F_z$ compositions using synthesis approaches described in U.S. application Ser. No. 12/246,814 to Venkatachalam et al. (the '814 application) entitled "Positive Electrode Material for Lithium Ion Batteries Having a High Specific Discharge Capacity and Processes for the Synthesis of these Materials" and U.S. application Ser. No. 12/332,735 to Lopez et al. (the '735 application) entitled "Positive Electrode Material for High Specific Discharge Capacity Lithium Ion Batteries", both incorporated herein by reference. In particular, surprisingly good results have been obtained for $Li[Li_{0.2}Ni_{0.175}Co_{0.10}Mn_{0.525}]O_2$. A carbonate co-precipitation process described in the '735 application gave desired lithium rich metal oxide materials having cobalt in the composition and exhibiting the high specific capacity performance with superior tap density. These copending patent applications also describe the effective use of coatings to improve performance and cycling.

In particular, it has been discovered that metal fluoride coatings can provide significant improvements for lithium rich layered positive electrode active materials described herein. These improvements relate to long term cycling with significantly reduced degradation of capacity, a significant decrease in first cycle irreversible capacity loss and an improvement in the capacity generally. The amount of coating material can be selected to accentuate the observed performance improvements. The bulk of the first cycle irreversible capacity loss is generally attributed to the positive electrode material.

However, the coating itself is not electrochemically active. When the loss of specific capacity due to the amount of coating added to a sample exceeds where the benefit of adding coating is offset by its electrochemical inactivity, reduction in battery capacity can be expected. In general, the amount of coating can be selected to balance the beneficial stabilization resulting from the coating with the loss of specific capacity due to the weight of the coating material that generally does not contribute directly to a high specific capacity of the material. In general, the amount of coating material ranges from about 0.01 mole percent to about 10 mole percent, in further embodiments from about 0.1 mole percent to about 7 mole percent, in additional embodiments from about 0.2 mole percent to about 5 mole percent, and in other embodiments from about 0.5 mole percent to about 4 mole percent. A person of ordinary skill in the art will recognize that additional ranges of coating material within the explicit ranges above are contemplated and are within the present disclosure. The amount of coating material effective in coated metal oxide materials to improve the capacity of the uncoated material is related to the particle size and surface area of the uncoated material. In particular, a higher mole percentage of metal fluoride coating generally can be used for a higher surface area powder to achieve an equivalent effect relative to a coating on a lower surface area powder.

The positive electrode active compositions can exhibit surprisingly high specific capacities in lithium ion cells under realistic discharge conditions. In some embodiments based on improved synthesis approaches, the lithium rich positive electrode active materials with the composite crystal structure can exhibit high specific capacity that is above 250 mAh/g at room temperature with good cycling properties for discharge from 4.6 volts. In some other embodiments, the lithium rich positive electrode active materials with the composite crystal structure used herein can exhibit high specific capacity that is above 235 mAh/g at room temperature with good cycling properties for discharge from 4.6 volts and high tap density above 1.8 g/mL. In general, when specific capacities are comparable, a higher tap density of a positive electrode material results in a higher overall capacity of a battery. It is noted that during charge/discharge measurements, the specific capacity of a material depends on the rate of discharge. A higher capacity of a specific cell is measured at very slow discharge rates relative to faster rates. In actual use, the actual capacity is less than the maximum capacity due to discharge at a finite rate. More realistic capacities can be measured using reasonable rates of discharge that are more similar to the rates during use. For low to moderate rate applications, a reasonable testing rate involves a discharge of the cell over three hours. In conventional notation this is written as C/3 or 0.33C. The positive electrode active materials used herein can have a specific discharge capacity of at least about 250 mAh/g at a discharge rate of C/3 at the tenth discharge/charge cycle at room temperature when discharged from 4.6 volts. In some embodiments, the positive electrode active materials used herein can have a specific discharge capacity of at least about 250 mAh/g at a discharge rate of C/10 at room temperature when discharged from 4.6 volts and tap density above 1.8 g/mL.

The positive electrode material can synthesized generally by co-precipitation processes or sol-gel processes detailed in U.S. application Ser. No. 12/246,814 to Venkatachalam et al. entitled "Positive Electrode Material for Lithium Ion Batteries Having a High Specific Discharge Capacity and Processes for the Synthesis of these Materials" and U.S. application Ser. No. 12/332,735 to Lopez et al. entitled "Positive Electrode Material for High Specific Discharge Capacity Lithium Ion Batteries", both incorporated herein by reference. In some embodiments, the positive electrode material is synthesized by precipitating a mixed metal hydroxide or carbonate composition from a solution comprising +2 cations wherein the hydroxide or carbonate composition has a selected composition. The metal hydroxide or carbonate precipitates are then subjected to heat treatment etc. to form a crystalline layered lithium metal oxide composition.

Battery Cell Design

The desirable negative electrode materials described herein can be effectively incorporated into lithium ion batteries with desirable performance associated with the negative electrode. In some embodiments of improved batteries herein, high energy positive electrode materials described above can be effectively incorporated into the batteries to achieve extremely high performance values. The combination of high energy capacity negative electrode active materials and high energy capacity positive electrode materials can provide for particularly desirable performance for the resulting battery with respect to capacity and cycling. In particular, the ability to synthesize high energy density electroactive materials with a high tap density has been found to allow for positive electrodes at high active material loadings. Based on important advances with respect to positive electrode active materials, batteries can be formed having very high energy densities as well as high volumetric energies. Desirable battery designs are further described in copending patent application Ser. No. 12/403,521 to Buckley et al filed on Mar. 13, 2009 entitled "High Energy Lithium Ion Secondary Batteries", incorporated herein by reference. Further improvements can be expected for the combination with the desirable negative electrode materials described herein.

A schematic diagram of a pouch battery is shown in FIG. 1. Specifically a pouch cell battery 100 is shown schematically having a negative electrode 102, a positive electrode 104 and a separator 106 between negative electrode 102 and positive electrode 104. A battery can comprise multiple positive electrodes and multiple negative electrodes, such as in a stack, with appropriately placed separators. Electrolyte in contact with the electrodes provides ionic conductivity through the separator between electrodes of opposite polarity. A battery generally comprises current collectors 108, 110 associated respectively with negative electrode 102 and positive electrode 104. The stack of electrodes and separators can be enclosed in a laminated film casing 112.

Commercial cells are generally designed to have an excess capacity in the negative electrode relative to the positive electrode so that the cells are not limited by the anode during discharge and so that lithium metal does not plate out on the negative electrode during recharge of the cell. Lithium metal can cause cycling problems as well as safety concerns due to the reactivity of the lithium metal. To achieve the desired high energy for the cell, the negative electrode structure can be made thicker so that the negative electrode can provide the appropriate capacity in view of very high positive electrode capacities.

The positive electrode active compositions and negative electrode active compositions generally are powder compositions that are held together in the corresponding electrode with a polymer binder. The binder provides ionic conductivity to the active particles when in contact with the electrolyte. Suitable polymer binders include, for example, polyvinylidine fluoride (PVDF), polyethylene oxide, polyethylene, polypropylene, polytetrafluoroethylene, polyacrylates, rubbers, e.g. ethylene-propylene-diene monomer (EPDM) rubber or styrene butadiene rubber (SBR), copolymers thereof and mixtures thereof. The positive electrode active material loading in the binder can be large, such as greater than about 80 weight percent. To form the electrode, the powders can be blended with the polymer in a suitable liquid, such as a solvent for the polymer. The resulting paste can be pressed into the electrode structure.

The positive electrode composition generally also comprises an electrically conductive powder distinct from the electroactive composition. Suitable supplemental electrically conductive powders include, for example, graphite, carbon black, graphite or carbon powders, carbon fibrils, carbon whiskers, metal powders, such as silver powders, carbon fibers, metal fibers, such as stainless steel fibers, and the like, and combinations thereof. While the metal alloy/intermetallic compositions described herein generally provide for electrical conductivity within the negative electrode structure, the negative electrode can optionally further comprise supplemental electrically conductive powders, such as the conductive powders above. In some embodiments, the negative electrode comprises no more than about 15 weight percent supplemental electrically conductive powders, in other embodiments no more than about 10 weight percent, and in additional embodiments from about 0.5 to about 8 weight percent supplemental electrically conductive powders. A person of ordinary skill in the art will recognize that additional ranges of conductive powder composition within the explicit ranges above are contemplated and within the present disclosure. While the supplemental electrically conductive compositions are described as powders, these materials lose their powder character following incorporation into the electrode where the associated particles of the supplemental electrically conductive material become a component of the resulting electrode structure.

The positive electrode generally is associated with an electrically conductive current collector to facilitate the flow of electrons between the electrode and an exterior circuit. The current collector can comprise metal, such as a metal foil, a metal grid or screen, or expanded metal. Expanded metal current collectors refer to metal grids with a greater thickness such that a greater amount of electrode material is placed within the metal grid. In some embodiments, the current collector can be formed from nickel, aluminum, stainless steel, titanium or the like. The electrode material can be cast in contact with the current collector. For example, in some embodiments, the electrode material in contact with the current collector foil or other structure can be subjected to a pressure from about 2 to about 10 kg/cm$^2$ (kilograms per square centimeter). The pressed structure can be dried, for example in an oven, to remove the solvent from the electrode. Metal foils can be used as current collectors. For example, copper foils can be used as current collectors for negative electrodes and aluminum foil can be used as positive electrode current collectors. Pastes or slurries of the cathode materials can be coated onto both sides of the foil. Then, the electrodes can be pressed using calendering rolls, a press with a die or other suitable processing apparatus to compress the electrodes to a desired thickness. The positive electrodes can have an active material particle loading on each side of the current collector from 20 mg/cm$^2$ to 50 mg/cm$^2$. The positive electrodes can have a density of at least 2.5 grams per milliliter (g/mL), in further embodiments at least about 2.8 g/ml and in additional embodiments from about 3.0 g/mL to about 3.5 g/mL. A person of ordinary skill in the art will recognize that additional ranges of active material loading within the explicit range above are contemplated and are within the present disclosure.

In some embodiments, the negative electrodes can be similarly prepared with respect to contact of the electrode composition with the current collector as well as drying and pressing the resulting structure. In embodiments in which the negative electrode comprises a foamed electrically conductive current collector, the resulting electrode may not have a separate metal foil or metal grid current collector element. The formation of electrodes with foamed metal current collectors is described further below.

The separator is located between the positive electrode and the negative electrode. The separator is electrically insulating while providing for at least selected ion conduction between the two electrodes. A variety of materials can be used as separators. For example, glass fibers formed into a porous mat can be used as a separator. Commercial separator materials are generally formed from polymers, such as polyethylene and/or polypropylene that are porous sheets that provide for ionic conduction. Commercial polymer separators include, for example, the Celgard® line of separator material from Hoechst Celanese, Charlotte, N.C. Suitable separator materials include, for example, 12 micron to 40 micron thick trilayer polypropylene-polyethylene-polypropylene sheets, such as Celgard® M824, which has a thickness of 12 microns. Also, ceramic-polymer composite materials have been developed for separator applications. These composite separators can be stable at higher temperatures, and the composite materials can significantly reduce the fire risk. The polymer-ceramic composites for separator materials are described further in U.S. patent application 2005/0031942A to Hennige et al., entitled "Electric Separator, Method for Producing the Same and the Use Thereof," incorporated herein by reference. Polymer-ceramic composites for lithium ion battery separators are sold under the trademark Separion® by Evonik Industries, Germany.

Electrolytes for lithium ion batteries can comprise one or more selected lithium salts. Appropriate lithium salts generally have inert anions. Suitable lithium salts include, for example, lithium hexafluorophosphate, lithium hexafluoroarsenate, lithium bis(trifluoromethyl sulfonyl imide), lithium trifluoromethane sulfonate, lithium tris(trifluoromethyl sulfonyl) methide, lithium tetrafluoroborate, lithium perchlorate, lithium tetrachloroaluminate, lithium chloride and combinations thereof. Traditionally, the electrolyte comprises a 1 M concentration of the lithium salts. In some embodiments, conventional electrolyte compositions can be used, such as a 1 molar solution of LiPF$_6$ in a blend of ethylene carbonate and dimethylcarbonate at a 1 to 1 by volume ratio. In some particular embodiments, solid electrolyte can be used, which generally also functions as the separator for electrodes. Solid electrolytes are described further, for example, in U.S. Pat. No. 7,273,682 to Park et al., entitled "Solid Electrolyte, Method for Preparing the Same, and Battery Using the Same," incorporated herein by reference.

For lithium ion batteries of interest, a non-aqueous liquid is generally used to dissolve the lithium salt(s). The solvent is generally inert and does not dissolve the electroactive materials. Appropriate solvents include, for example, propylene carbonate, dimethyl carbonate, diethyl carbonate, 2-methyl tetrahydrofuran, dioxolane, tetrahydrofuran, methyl ethyl carbonate, γ-butyrolactone, dimethyl sulfoxide, acetonitrile, formamide, dimethyl formamide, triglyme (tri(ethylene glycol) dimethyl ether), diglyme (diethylene glycol dimethyl ether), DME (glyme or 1,2-dimethyloxyethane or ethylene glycol dimethyl ether), nitromethane and mixtures thereof.

The electrodes described herein can be incorporated into various commercial cell designs. For example, the cathode compositions can be used for prismatic shaped cells, wound cylindrical cells, coin cells, pouch cells or other reasonable cell shapes. The cells can comprise a single electrode structure of each polarity or a stacked structure with a plurality of positive electrodes and negative electrodes assembled in parallel and/or series electrical connection(s). In particular, the battery can comprise a stack of alternating positive electrodes and negative electrodes with separators between them. Generally, the plurality of electrodes is connected in parallel to increase the current at the voltage established by a pair of a positive electrode and a negative electrode. While the positive electrode active materials can be used in batteries for primary, or single charge use, the resulting batteries generally have desirable cycling properties for secondary battery use over multiple cycling of the cells.

In some embodiments, the positive electrode and negative electrode can be stacked with the separator between them, and the resulting stacked structure can be rolled into a cylindrical or prismatic configuration to form the battery structure. Appropriate electrically conductive tabs can be welded or the like to the current collectors and the resulting jellyroll structure can be placed into a metal canister or polymer package, with the negative tab and positive tab welded to appropriate external contacts. Electrolyte is added to the canister, and the canister or package is sealed to complete the battery.

Some presently used rechargeable commercial cells include, for example, the cylindrical 18650 cells (18 mm in diameter and 65 mm long) and 26700 cells (26 mm in diameter and 70 mm long), although other cell sizes can be used. Cylindrical cell is a widely used battery packaging format. The cylindrical shape of the cell has the ability to withstand high internal and external pressure. Additionally, cylindrical cells can have a venting mechanism to release excessive internal pressure. Because of its cylindrical shape and fixed sizes, however, cylindrical battery cell generally has poor space utilization and has to be designed around available cell sizes. In a cylindrical cell, the electrodes and separators can be made into long thin sheets and rolled into a spiral or jelly-roll shape optionally around a rod shaped mandrel. Alternatively, the electrodes can be wound onto a flat mandrel to provide flattened shaped that can fit inside a prismatic case to make a prismatic cell. Electrodes can alternatively or additionally be stacked within a prismatic shaped cell.

Prismatic cells come in various sizes that can be custom-made to meet different size and energy demands. One version of a prismatic cell is referred to as a pouch cell, which generally has a heat-sealable foil to enclose rolled or stacked electrodes and separators as an alternative to a metal can. Pouch cell battery format generally allows tailoring to exact cell dimensions and makes the most efficient use of available space and can sometimes achieve a packaging efficiency of 90 to 95 percent, the highest among battery packs. Because of the absence of a metal can, the pouch cells are generally light. Prismatic and pouch cell formats can contain a plurality of positive electrode sheets and negative electrode sheets that are sandwiched together in layers with separators in-between.

In some embodiments, the positive electrode can comprise from about 90 to about 99 weight percent active material, in further embodiments from about 92 to 98 weight percent, in additional embodiments from about 92. to about 97.5 weight percent and in other embodiments from about 92.5 to about 97 weight percent active material. Similarly, the positive electrode can comprise from about 0.1 to about 8 weight percent supplemental electrically conductive agent, in further embodiments from about 0.5 to about 6 weight percent electrically conductive agent and in additional embodiments form about 1 to about 5 weight percent electrically conductive agent. In addition, the positive electrode can comprise from about 0.5 to about 8 weight percent polymer binder, in further embodiments from about 1.0 to about 6 weight percent polymer binder and in additional embodiments form about 1.5 to about 5 weight percent polymer binder. A person of ordinary skill in the art will recognize that additional ranges of amounts of positive electrode compositions within the explicit ranges above are contemplated and are within the present disclosure. Suitable conductive agents include, for example, graphite powder, carbon black, graphite or carbon fibers, carbon fibrils, carbon whiskers, combinations thereof and the like.

The specific negative electrode materials are described in detail in the following discussion along with some specific features for some of the electrodes. Due to the nature of the negative electrode materials, the loading of active materials into the negative electrode is selected as appropriate for the particular negative electrode material. Generally, the negative electrode comprises from 75 weight percent to about 99 weight percent, in other embodiments from about 78 weight percent to about 98 weight percent and in further embodiments form about 80 to about 96 weight percent active material. With respect to supplemental electrically conductive materials, the negative electrode can comprise in some embodiments from about 0.1 to about 8 weight percent supplemental electrically conductive agent, in further embodiments from about 0.25 to about 6 weight percent electrically conductive agent and in additional embodiments form about 0.5 to about 5 weight percent electrically conductive agent. In general, the negative electrode may not comprise a supplemental electrically conductive agent since the electrode active material may be electrically conductive, but it may be desirable to include a supplemental electrically conductive material to further increase electrical conductivity or as a processing aid. Supplemental electrically conductive agents do not include compositions with reasonable reactive activity within the negative electrode with a blend of active compositions. In addition, the negative electrode can comprise in some embodiments from about 0.5 to about 15 weight percent polymer binder, in further embodiments from about 1.0 to about 12 weight percent polymer binder and in additional embodiments form about 1.5 to about 10 weight percent polymer binder. A person of ordinary skill in the art will recognize that additional ranges of amounts of positive electrode compositions within the explicit ranges above are contemplated and are within the present disclosure. The compositions for the electrode do not include the mass of the current collector even for embodiments with a foamed current collector in which the electrode composition is intimately interspersed within the current collector structure.

Negative Electrode

Commercial cells are generally designed to have an excess capacity in the negative electrode relative to the positive electrode so that the cells are not limited by the anode during discharge and so that lithium metal does not plate out on the negative electrode during recharge of the cell. Lithium metal can cause cycling problems as well as safety concerns due to the reactivity of the lithium metal. To achieve the desired high energy for the cell, the negative electrode structure can be improved so that the negative electrode can provide the appropriate capacity, which can be particularly desirable for embodiments with very high positive electrode capacities.

Suitable negative electrodes for lithium secondary batteries can comprise a negative electrode active material and a current collector. Generally, a polymer binder is used to maintain the physical integrity of the electrode while holding a particulate active material within the structure. In general, it is desirable to incorporate an active material with a high energy density and/or with good cycling properties. For commercial batteries, high energy density active materials correspond with a higher capacity while the better cycling properties result in a battery with a longer lifetime. The improved negative electrode structures are designed to provide higher energy density negative electrodes without sacrificing the cycling properties. In general, negative electrode active materials include, for example, graphitic carbon, coke, hard carbon and metal oxides, such as tin oxide and lithium titanium oxide. The particular negative electrode material influences the discharge voltage of the resulting cell based on a comparison of the half reactions at the negative electrode and the positive electrode.

The negative electrodes described herein can take advantage of the use of particular active materials. In particular, the active materials can be selected to inherently have desirable properties. For example, in some embodiments metal alloy/intermetallic active materials can be used with a submicron average particle size. The high surface area of the submicron active materials can result in improved cycling properties. These high surface area metal alloy/intermetallic active materials can further be combined with submicron lithium titanium oxide particles. Lithium titanium oxide particles have been observed to have excellent cycling properties in negative electrodes of lithium ion batteries. The use of submicron lithium titanium oxide particles with submicron metal alloy/intermetallic particles can provide a high degree of surface contact between the materials that takes advantage of the excellent cycling of the lithium titanium oxide particles as well as the high energy density of the metal alloys/intermetallics.

Suitable metal alloy/intermetallic compositions are described in detail below. Technically, alloy/intermetallic materials, with some exceptions, are distinct from each other. Alloys are homogeneous mixtures or solid solutions of metal elements, optionally with some amounts of non-metal atoms dissolved into the metal. Intermetallic materials are solid phases with two or more metal/metalloid elements, optionally with non-metal elements, with a structure different from the crystal of the constituent materials. In some embodiments, the alloy/intermetallic compositions are processed to maintain an amorphous or low crystallinity nature of the material to improve the cycling performance.

In some embodiments, the negative electrode comprises electrically conductive structures with a porous nature that can accommodate volume changes of the active material. While not intending to be limited by theory, it is believed that the highly porous material provides some void volume. The void volume provides for moderate volume expansion of the negative electrode material during charging with lithium while leading to a reduced amount of stress within the active material. Stress reduction may also occur by reducing the particle size and by reducing the crystallinity. It is believed that the stress reduction can result in a corresponding decrease in irreversible structural changes in the material upon cycling such that the performance of the negative electrode degraded more slowly upon cycling, and a battery formed with the negative electrode can have satisfactory performance over a larger number of battery cycles. Suitable highly porous electrically conductive materials include, for example, foamed metal current collectors, foamed carbon current collectors and highly porous carbon particles. The use of submicron active particles can result in improved incorporation of the active material into the highly porous structure for improved synergy.

Although some negative electrode active materials, such as tin oxide and silicon, have the potential to provide increased energy density, these alternatives materials have been found to be unsuitable commercially due to poor discharge and recharge cycling related to structural changes and anomalously large volume expansions, especially for silicon, that are associated with lithium intercalation/alloying. The structural changes and large volume changes can destroy the structural integrity of the electrode, thereby decreasing the cycling efficiency. To obtain high energy density negative electrodes having properties such as minimal structural and volume alterations during charge/discharge cycles, components with synergistic properties can be selected and used for constructing the negative electrodes such that high energy density active materials can be used more effectively. For example, foamed metal, foamed carbon, carbon fibers or porous carbon can be used to absorb at least a portion of the volume change of the negative electrode active material as the active material alloys or otherwise incorporates lithium or releases lithium. In some embodiments, negative electrode active materials can be made into submicron sized particles to fit into the pores of the foamed metal, foamed carbon or porous carbon. Additionally or alternatively, submicron lithium titanate is added as part of the negative electrode active material to improve cycling properties and to reduce overall volume changes upon cycling of the secondary battery.

Appropriate metal alloys/intermetallics are of interest as a negative electrode active material due to their high energy density and moderate volume change upon cycling. Particular metal alloys/intermetallics are presented in the following discussion. Suitable processing approaches are also discussed for forming submicron particles of these materials. After a discussion of the metal alloys/intermetallics, the highly porous electrically conductive materials are discussed.

Metal Alloys/Intermetallics

Crystalline inter-metallic materials were proposed for negative electrodes in U.S. Pat. No. 6,528,208 to Thackery et al., entitled "Anodes for Rechargeable Lithium Batteries," incorporated herein by reference. These inter-metallic compositions comprised compositions, such as $Cu_6Sn_5$, $Cu_6Sn_6$, or $Cu_6Sn_4$ with tin as an active element that alloys with lithium and copper as an inactive element, or $Li_2CuSn$ or variations thereof ($Cu_{6-x}Ni_xSn_5$ or $Cu_{6-x}Zn_xSn_5$). While the inactive metal elements do not alloy with lithium during charging of the cell, these elements contribute to the electrical conductivity of the material which reduces the impedance of the cell. These inter-metallic compositions have been described generally as having hexagonally closed packed NiAs-type structures or defect-$Ni_2In$-type structures. However, the NiAs structure has a hexagonally closed packed crystal structure that transforms to a cubic closed packed crystal structure upon lithiation such that a significant structural change takes place. Also, copper can be ejected from the lattice upon lithiation, i.e., lithium alloying.

Negative electrode metal alloy/intermetallic compositions with the structure $Cu_{6-x}M_xSn_5$, with $x<=3$ and M being one or more metals or Si, are described further in U.S. Pat. No. 6,730,429 to Thackery et al., entitled "Intermetallic Negative Electrodes for Non-Aqueous Lithium Cells and Batteries," incorporated herein by reference. However, these materials do not overcome cycling problems since elemental Cu can be released from the lattice when lithium is intercalated into the material and this copper release results in undesirable structural changes in the material. Alternative crystalline intermetallic compositions are described in U.S. Pat. No. 6,855,460 to Vaughey et al., entitled "Negative Electrodes for Lithium Cells and Batteries," incorporated herein by reference. This additional type of crystalline intermetallic compositions includes compounds with the formula $M_2M'$ having a $Cu_2Sb$-type structure, in which M and M' are two or more metal elements or silicon, for example, $Mn_2Sb$.

Other multi-phased materials for negative electrodes are described in U.S. published patent application 2007/0148544A to Le, entitled "Silicon-Containing Alloys Useful as Electrodes for Lithium-Ion Batteries," incorporated herein by reference. These materials have the structure $Si_xSn_qM_yC_z$, where $(q+x)>2y+z$, $q>=0$, $z>=0$ and M is a metal selected from manganese, molybdenum, niobium, tungsten, tantalum, iron, copper, titanium, vanadium, chromium, nickel, cobalt, zirconium, yttrium and combinations thereof. A multi-phased microstructure of the material has an amorphous Si phase, a nanocrystalline metal silicide phase, a silicon carbide phase when $z>0$, and an amorphous Sn phase when $q>0$.

Other intermetallic compositions for negative electrodes have been described with the composition Sn-E-M in U.S. Pat. No. 7,229,717 to Yamaguchi et al., entitled "Anode Active Material and Battery Using it," incorporated herein by reference. In the Yamaguchi et al. composition (Sn-E-M), E is boron (B), carbon (C), aluminum (Al), phosphorous (P) or a combination thereof, and M is a metal selected from silicon, magnesium, titanium, vanadium, chromium, manganese, iron, cobalt, nickel, copper, zinc, gallium, zirconium, niobium, molybdenum, silver, indium, cerium, hafnium, tantalum, tungsten, bismuth and combinations thereof. The content of "E" is described to range from 9.8 weight percent to 49 weight percent. Yamaguchi et al. assert that improved cycling can result from increased amounts of amorphous character, i.e., decreased amounts of crystalline character, for these compositions. These intermetallic and metal alloy compositions can be incorporated into the negative electrodes of the batteries described herein.

Desirable intermetallic compositions with selected composition ranges and/or a more amorphous structure have been described in copending U.S. provisional patent application Ser. No. 61/113,445 filed on Nov. 11, 2008 to Kumar, entitled "Inter-Metallic Compositions, Negative Electrodes With Inter-Metallic Compositions, and Batteries," incorporated herein by reference. The particular compositions described in this provisional patent application have compositions designed to reduce some of the undesirable effects obtained generally with the broader ranges of intermetallic compositions. Furthermore, the conversion to more amorphous alloy structures relative to the intermetallic materials can further ameliorate the degradation upon cycling due to less drastic structural changes. Similarly, the formation of these materials with an average particle size of no more than a micron can also lead to improved cycling.

It has been realized that submicron metallic particles can reduce some of the structural changes that take place at the particles as a result of lithium intercalation or alloying. In particular, submicron particles have a significantly larger surface area. Due to the larger surface area, elements can be released from the particles, and surface restructuring can be accommodated, both with reduced overall structural changes in the particles and with reduced volume changes. Thus, the submicron or nanoscale powders can exhibit improved cycling properties. The submicron metal alloy/intermetallic particles can be formed through milling of initially submicron or nanoscale starting powders to form the alloys, which can have stoichiometries within the ranges described above for the particular intermetallic compositions. In general, the submicron metal particles, e.g., alloys or intermetallics, can have an average diameter of no more than a micron, in some embodiments no more than 500 nanometers (nm), in additional embodiments no more than 250 nm, in other embodiments no more than about 100 nm and in further embodiments from about 5 nm to about 60 nm. A person of ordinary skill in the art will recognize that additional ranges within these explicit ranges of average diameters are contemplated and are within the present disclosure. The particle diameter can be measured as an average of the lengths along the three principle axes of the particle for particles that are not spherical. The particle diameters can be evaluated using transmission electron microscopy.

In general, amorphous materials can have improved cycling since structural changes associated with lithium intercalation or alloying do not result in propagating lattice disruptions, which can magnify structural and volume changes. Therefore, it can be desirable to process the materials to favor the formation of amorphous or less crystalline alloy materials. In particular, alloy/intermetallic materials can be formed by milling, such as ball milling, initially amorphous starting materials as powders to alloy the initial materials. In this way, amorphous alloy/intermetallic particles can be formed with selected composition ranges. Submicron metal powders are available, for example, from Sigma-Aldrich, WI, U.S., American Elements, CA, U.S. and MTI Corporation, CA, U.S.

As noted above, milling can be a suitable approach for the formation of metal alloy/intermetallic powders, although alternative alloying approaches can be used in some embodiments. However, as noted above, milling can be desirable from a particle size perspective as well as allowing retention of a low level of crystallinity or amorphous character. Suitable milling can be performed with, for example, commercially available equipment and methods using ball mills, bead mills, attritors, shaker mills or rod mills. Both laboratory scale and commercial scale milling apparatuses can be purchased, such as a Paul O. Abbé Lab Jar Rolling Mill with suitable grinding media. The milling jar can be filled with argon or other inert gas during the milling process to reduce or eliminate oxidation during alloying. The milling time, rotation speed, amount of feed material, and amount of grinding media can be selected to achieve desired grinding results with a homogeneous product with a particular mill. Some other process agents, such as organic acids, alcohols, heptanes, aldehydes, ether or combinations thereof, may also be added to the jar prior to milling. Examples of suitable grinding media include, for example, zirconia, alumina, tungsten carbide, and the like. The alloy/intermetallic particles can be analyzed for crystallinity using an x-ray diffraction pattern, and surface area can be measured using the BET technique. The particle size can be measured from transmission electron micrographs.

It has been realized that a synergistic performance can be obtained using a blend of a submicron metal alloy/intermetallic particles and submicron lithium titanate particles. Lithium titanate, i.e., lithium titanium oxide, with a submicron or nano-scale average particle diameter is described further in U.S. Pat. No. 6,749,648 to Kumar et al., entitled "Lithium Metal Oxides," incorporated herein by reference. In general, the submicron lithium titanate particles can have an average diameter of no more than a micron, in some embodiments no more than 500 nanometers (nm), in additional embodiments no more than 250 nm, in other embodiments no more than about 100 nm and in further embodiments from about 5 nm to about 60 nm. A person of ordinary skill in the art will recognize that additional ranges within these explicit ranges of average diameters are contemplated and are within the present disclosure. In particular, the particle blend is expected to have reduced effects of volume changes due to a combination of the materials along with the submicron particle sizes. Thus, the blend can take advantage of the high energy density of the metal alloy/intermetallic composition along with the more stable cycling of the lithium titanate. The blend of active materials generally comprises from about 1 weight percent to about 45 weight percent and in further embodiments from about 2.5 weight percent to about 35 weight percent lithium titanate relative to the combined weight of the metal alloy/intermetallic and the lithium titanate. A person of ordinary skill in the art will recognize that additional ranges of lithium titanate composition within the explicit ranges above are contemplated and are within the present disclosure.

Porous Carbon

In general, powder metal alloy/intermetallic active material can be combined with a binder and formed into a negative electrode material without a further conductive powder due to an appropriate level of electric conductivity of the active material. However, in some embodiments, it may be desirable for the negative electrode to comprise supplemental electrically conductive particles to further improve electrical conductivity and/or for processing considerations. While these alloy/intermetallic compositions have less proportional volume expansion and contraction than pure silicon, metal alloy/intermetallic compositions still have significant volume changes during the cycling of a lithium ion battery. However, it has been realized that a porous, high surface area carbon material can help to absorb or compensate for at least some of the volume changes of a metal alloy/intermetallic or elemental metal powder, due to the highly porous nature of the carbon.

Suitable high surface area porous carbons include, for example, activated carbon, mesoporous carbon, and the like. In general, the high surface area porous carbon can have a BET surface area of at least about 250 $m^2/g$, in further embodiments at least about 255-500 $m^2/g$ and in additional embodiments from about 550 to about 3500 $m^2/g$. Commercially available activated carbon powders are available from Aldrich chemical with a surface area of 600 or 750 $m^2/g$ and activated carbon powder with a surface area of 1000 $m^2/g$ is available from General Carbon Corp, NJ, USA. Mesoporous carbon with a surface area from 1000-3000 $m^2/g$ is described in U.S. Pat. No. 6,251,822 to Peng et al., entitled "Method of Making Activated Carbon Derived From Pitches," incorporated herein by reference. In some embodiments, the negative electrode comprises from about 0.1 to about 50 percent high surface area carbon, and in further embodiments from about 10 weight percent to about 40 weight percent high surface area carbon relative to the weight of metal alloy/intermetallic active material. A person of ordinary skill in the art will recognize that additional ranges of surface area and negative electrode composition are contemplated and are within the present disclosure.

The deposition of SnSb alloy onto mesocarbon particles is described in an article by Shi et al., entitled "Nano-SnSb alloy deposited on MCMB as an anode material for lithium ion batteries," J. Materials Chemistry Vol. 11(5) pp 1502-1505 (2001), incorporated herein by reference. In contrast with the approach of Shi et al., in some embodiments herein the submicron metal alloy/intermetallic particles are separately formed and mixed with the highly porous carbon particles. In the approaches described herein, a high loading of metal alloy/intermetallic particles can be achieved and/or the properties of the metal alloy/intermetallic particles can be established during the formation of the particles. Thus, the use of distinct particles offers significant alternative properties with the potential for improved performance relative to particles or coatings directly plated onto the surface of the highly porous carbon with strong association with the carbon. The highly porous carbon may or may not be electrochemically active in the negative electrode of the lithium ion battery.

In general, the metal particles can be dispersed in a liquid along with the highly porous carbon articles although the order of adding the particles can be selected to achieve the desired results. The concentration of the particles in the dispersion can be selected also to achieve desired results. The dispersions with the combination of particles can be mixed and/or sonicated to facilitate the blending of the materials. After a desired degree of blending, the particle blend can be separated from the liquid though drying, filtration, centrifugation or the like.

Foamed Metal and Foamed Carbon

Foamed electrically conductive current collectors are structures with a high porosity while maintaining good electrical conductivity. The foamed current collectors generally also have sufficient mechanical integrity for manipulation of the resulting electrode. The foamed current collectors generally can be formed from suitable metals or conductive carbon material. In some embodiments, the properties of the foamed current collector, for example, with respect to mechanical integrity as well as electrical conductivity, are designed such that a separate foil or grid current collector does not need to be used in addition to the foamed current collector. Thus, the advantages of the foamed current collector can be exploited without the added weight and volume contributed by a foil or grid current collector. The foamed materials can be formed, for example, through the use of a pore forming agent that can be removed from the structure upon formation of the structure.

The foamed current collectors generally have an open cell structure with a high level of porosity. The porosity can be defined as one minus (the weight of the current collector divided by the product of the bulk density times the volume), which can be multiplied by 100 for a percent porosity. Thus, a 1 cubic centimeter foamed nickel current collector with a weight of 2.22 grams has a porosity of 75% since the density of nickel at room temperature is 8.90. The porosity can be selected to balance mechanical strength, mechanical resiliency and electrical conductivity. Furthermore, a more porous material can incorporate a greater amount of active material. The cell size can also be selected to facilitate incorporation of the particular active material. Also, an active material with a submicron average particle size can be effectively incorporated into a foamed metal current collector for reasonable cell sizes.

In some embodiments, the foamed current collector can have a porosity of at least about 60%, in further embodiments, from about 65% to about 99%, in other embodiments from about 68% to about 98% and in further embodiments from about 70% to about 97%. In addition, the average cell size can be from about 5 microns to about 250 microns, in further embodiments from about 8 microns to about 225 microns, and in other embodiments from about 10 microns to about 200 microns. A person of ordinary skill in the art will recognize that additional ranges of porosity and average cell size within the explicit ranges above are contemplated and are within the present disclosure. The quantities in this paragraph refer to properties of the foamed current collector prior to imbibing the current collector with an active material and further processing into the battery structure, which generally involves compression of the electrode.

In general, the thickness of the foamed current collector can be selected based on several factors such as the battery form factor, the volume capacity of the negative electrode and the properties of the positive electrode, accounting for any compression of the current collector during any compression steps. For some embodiments, the completed negative electrode can have a thickness from about 40 microns to about 200 microns, and in further embodiments from about 50 microns to about 175 microns. A person of ordinary skill in the art will recognize that additional ranges of negative electrode thickness within the explicit ranges above are contemplated and are within the present disclosure. The width and length of the negative electrode are generally selected based on the battery form factor as well as the packing of the electrode stack into the battery.

Foamed metal nickel electrodes has been described for use in nickel batteries in U.S. Pat. No. 4,957,543 to Babjak et al., entitled "Method of Forming Nickel Foam," incorporated herein by reference. For this application, the nickel foam was formed with a porosity between 95-99%, having appropriate electrical conductivity and tensile strength. In nickel batteries, the nickel electrode serves as an active material in the battery reactions. As described in this application, the foamed nickel is formed by reactive deposition of elemental nickel from nickel carbonyl reactant onto a polymer foam. The polymer foam is later decomposed to leave the nickel foam with a desired open pore structure. The polymer foam can be adjusted to provide a lower level of porosity, if desired, using the same synthesis approach.

The formation of metal foams that are loaded with electrically active compositions for the formation of a battery is described further in U.S. Pat. No. 6,383,687 to Gibbons et al., entitled "Production of a Porous Foam Product for Battery Electrodes," incorporated herein by reference. The use of foamed nickel for the formation of the nickel electrode loaded with nickel hydroxide for nickel-cadmium batteries in which the resulting structure is welded to a metal current collector foil is described in U.S. Pat. No. 5,374,491 to Brannan et al., entitled "High Density, High Capacity Battery Electrode," incorporated herein by reference. Similarly, the use of foamed nickel for nickel electrodes or loaded with active compositions for a lithium ion battery along with a separate metal current collector is described in U.S. Pat. No. 5,738,907 to Vaccaro et al., entitled "Conductive Metal Sheet Production," incorporated herein by reference. Also, the use of silicon active negative electrode material loaded onto a metal foam with a metal foil current collector for a lithium ion patent is described in U.S. Pat. No. 7,252,907 to Takeuchi et al., entitled Nonaqueous Electrolyte Secondary Battery," incorporated herein by reference. In general, the metal can be deposited onto a polymer foam, for example, using reactive deposition, plating, or painting with a conductive paint, such as a paint with conductive particles. Suitable polymer foams can comprise, for example, polyurethane, polystyrene, polyethylene, polypropylene, polyvinyl chloride, polyphenols, mixtures thereof, copolymers thereof or the like.

Additionally, foamed carbon current collector have been proposed for use in lead batteries as described in U.S. Pat. No. 6,979,513 (the '513 patent) to Kelley et al., entitled "Battery Including Carbon Foam Current Collectors," incorporated herein by reference. The method of forming foamed carbon current collector is also discussed in the '513 patent. Specifically, wood with substantially open structure is carbonated to form the carbon foam material with an average pore size of at least about 20 microns. The active material is believed to penetrate into the open pores of the foamed carbon and form a contract with the foamed carbon current collector. Carbon foam current collectors have also been formed from coal, which is heated in a non-oxidizing atmosphere, as described in U.S. Pat. No. 6,899,970 to Rogers et al., entitled "Electrochemical Cell Electrodes Comprising Coal-Based Carbon Foam," incorporated herein by reference.

It has been realized that if metal alloy/intermetallic powders are used, these materials supply sufficient electrical conductivity that if these are loaded into foamed metal or carbon, a separate foil or grid current collector may not be used to supply the desired overall impedance through the resulting cell. The removal of a separate metal current collector foil or grid increases the available space within the cell for active material and correspondingly also lowers the weight of the cell. On the other hand, the foamed metal or carbon can more easily adjust to volume changes in the cell that result from incorporation and release of lithium from the negative electrode material. Thus, there is a synergy resulting from the use of metal alloy/intermetallic active material and a foamed metal or carbon current collector.

In general, the active material can be incorporated into a paste or dispersion. The paste or dispersion can comprise a polymer binder. The concentration of the paste or dispersion can be adjusted to achieve a desired viscosity for effective incorporation into the foamed current collector. The paste or dispersion can be applied to the foamed current collector using any appropriate technique, such as spreading, spraying, immersion or the like. The use of active material with a submicron average particle size can facilitate the incorporation of the active material within the foamed current collector structure. After the negative electrode composition is applied to the foamed conductive current collector, the electrode can be dried to remove the solvent. Before or after drying, the foam current collector can be compressed to reduce the volume of the foamed current collector, and the compression can improve the electrical contact between the active material and the metal of the foamed current collector. The degree of compression can be selected to maintain sufficient volume to account for some volume changes of the active material upon cycling. After the negative electrode is assembled into a stack with a positive electrode and a separator between the two electrodes, the stack structure can be compress again prior to completing the battery assembly. The compression of the foamed current collector can reduce the pore volume by up to 75%, in further embodiments up to 70% and in additional embodiments from about 25% to about 65%. A person of ordinary skill in the art will recognize that additional ranges of reduction in pore volume within the explicit ranges above are contemplated and are within the present disclosure.

Composites of Nanoscale Carbon and Metal Alloys/Intermetallics

Another high surface area metal alloy/intermetallics embodiments involves metal alloy/intermetallics that is formed on the surface of nanoscale carbon. The nanoscale carbon provides a high surface area metal alloy/intermetallic material that can provide for effective adjustment of volume changed accompanying cycling with respect to lithium uptake and withdrawal. Suitable nanoscale carbon can comprise, for example, carbon black, single wall nanotubes, multiwall nanotubes or the like. The nanoscale carbon has a diameter no more than about 100 nanometers (nm) for particles and a cross section of no more than about 100 nm for fibers, and in additional embodiments a diameter from about 1 nm to about 50 nm for particles and a cross section from about 1 nm to about 50 nm for fibers. A person of ordinary skill in the art will recognize that additional ranges of dimensions within the explicit rages above are contemplated and are within the present disclosure.

In general, it can be desirable for the resulting composite to comprise at least about 35 weight percent metal alloy/intermetallic, in further embodiments at least about 45 weight percent and in additional embodiments form about 50 weight percent to about 95 weight percent metal alloy/intermetallic. A person of ordinary skill in the art will recognize that additional ranges of composition within the explicit ranges above are contemplated and are within the present disclosure. The nanoscale carbon generally can be a semiconductor or an electrical conductor. The carbon nanotubes may be an active material in the negative electrode of a lithium ion battery. The presence of a greater proportion of alloy/intermetallic relative to the nanoscale carbon can increase the electrode capacity while maintaining the high surface area and cycling properties. A greater proportion of metal alloy can be applied to the nanoscale carbon through a milling process where the nanoscale carbon and metal are milled together, such as using a ball mill or the like. The milling can be performed with previously prepared metal alloy particles and/or with elemental metal particles that are directly formed into the alloy during the milling with the nanoscale carbon.

Binder

The metal alloy/intermetallic powder can be combined with a binder generally with a solvent as well as any other negative electrode powder compositions for assembly into the negative electrode. Suitable binders include, for example, polyvinylidene fluoride (pvdf), polyethylene oxide, polytetrafluoroethylene, polyethylene, polypropylene, polyacrylates, and combinations thereof. In some embodiments, a rubber polymer can be used, such as ethylene propylene diene monomer (EPDM) rubber, styrene butadiene rubber (SBR) or mixtures thereof. Rubber compositions have a desirable elastic modulus that can provide for adjustments for volume changes of the active material with potentially less mechanical destabilization of the electrode as a result of the cell cycling. In some embodiments, a paste is formed that is then pressed on one or generally both sides of a current collector. Following the application of appropriate compression, the structure can be dried to form of the negative electrode.

The performance of the materials described herein can be tested at a laboratory scale, for example, using coin cell designs. The positive electrode can be fabricated by mixing a powder of active material, such as lithium cobalt oxide, with acetylene black and then with a binder, such as polyvinylidene fluoride (PVDF), which can be dissolved in N-methyl-pyrrolidone (NMP). The resulting slurry can be cast on an aluminum foil current collector. Electrodes with a loading between 2 and 10 mg/cm$^2$ (milligrams per square centimeter) can be dried for 24 hours in a vacuum oven maintained at a temperature from 100° C. to 120° C.

Similarly, to form the negative electrode, the metal alloy/intermetallic powder blended in a solution with a PVDF binder can be cast with NMP onto a copper current collector, such as a copper foil. The cast negative electrode can be dried in an over at a temperature from 100° C. to 120° C. for 24 hours. A Celgard® separator material (polypropylene/polyethylene/polypropylene) can be used between the negative electrode and positive electrode. Before assembling the cell, the separator material can be soaked in electrolyte, 1M LiPF$_6$ in ethylene carbonate/diethyl carbonate (1:1) solvent. The assembled cathode-separator-anode structure is sealed within the coin cell. Several coin cells can be assembled for each sample in a dry box, and the cell performance can be tested with a commercial cycle tester, such as using commercial testing equipment from Maccor, Inc. Tulsa, Okla. Similarly, electrodes formed with inter-metallic powders can be tested as positive electrodes against lithium metal negative electrodes.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

We claim:

1. A lithium ion battery comprising a positive electrode, a negative electrode, a separator between the positive electrode and the negative electrode and an electrolyte comprising lithium ions,
    wherein the negative electrode comprises a composite composition formed through milling of metal and/or metal alloy/intermetallic particles and from about 12 to about 65 weight % of high surface area carbon particles that have submicron particle size, and
    wherein the positive electrode comprises an electroactive material having discharge capacity at a 10th discharge cycle of at least 240 mAh/g at room temperature at a discharge rate of C/3 when discharged from 4.6 volts to 2.0 volts.

2. The lithium ion battery of claim 1 wherein the high surface area carbon particles have a Brunauer-Emmett-Teller (BET) surface area from about 255 to about 3500 m$^2$/g.

3. The lithium ion battery of claim 1 wherein the high surface area carbon particles comprise activated carbon, mesoporous carbon, or combination thereof.

4. The lithium ion battery of claim 1 wherein the metal and/or metal alloy/intermetallic particles have an average particle size of no more than 1 micron.

5. The lithium ion battery of claim 1 wherein the metal and/or metal alloy/intermetallic particles comprise elemental silicon.

6. The lithium ion battery of claim 1 wherein the high surface area carbon particles have a Brunauer-Emmett-Teller (BET) surface area of at least about 250 m$^2$/g.

7. The lithium ion battery of claim 1 wherein the composite comprises at least about 65 weight percent metal and/or metal alloy/intermetallic.

8. The lithium ion battery of claim 1 wherein the metal and/or metal alloy/intermetallic particles are amorphous.

9. The lithium ion battery of claim 1 wherein the metal and/or metal alloy/intermetallic particles have an average particle size of no more than 250 nm 10. The lithium ion battery of claim 1 wherein the metal and/or metal alloy/intermetallic particles comprises a tin-copper alloy or an alloy of copper, tin and one or more additional metals, tin, or combination thereof.

11. The lithium ion battery of claim 1 wherein the metal alloy/intermetallic particles comprises a composition having a formula $Si_xSn_qM_yC_z$, where $(q+x)>2y+z$, $q>=0$, $z>=0$ and M is a metal selected from manganese, molybdenum, niobium, tungsten, tantalum, iron, copper, titanium, vanadium, chromium, nickel, cobalt, zirconium, yttrium and combinations thereof having at least about 40 weight percent and about 80 atomic percent Si as an amorphous Si phase, a nanocrystalline metal silicide phase, a silicon carbide phase when z>0, and an amorphous Sn phase when q>0.

12. The lithium ion battery of claim 1 wherein the metal alloy/intermetallic particles comprises a composition having a formula Sn-E-M, where E is boron (B), carbon (C), aluminum (Al), phosphorous (P) or a combination thereof ranging from 9.8 weight percent to 49 weight percent, and M is a metal selected from silicon, magnesium, titanium, vanadium, chromium, manganese, iron, cobalt, nickel, copper, zinc, gallium, zirconium, niobium, molybdenum, silver, indium, cerium, hafnium, tantalum, tungsten, bismuth and combinations thereof.

13. The lithium ion battery of claim 1 wherein the electroactive material of the positive electrode has a $10^{th}$ cycle specific discharge capacity of at least 235 mAh/g at room temperature and a tap density of at least 1.8 g/mL, wherein the specific discharge capacity is determined at a discharge rate of C/3 when discharged from 4.6 volts to 2.0 volts.

14. The lithium ion battery of claim 1 wherein the negative electrode further comprises a foamed current collector impregnating the electroactive negative electrode composite and lacks a foil current collector or a grid current collector separate from the foamed current collector.

15. The lithium ion battery of claim 14 wherein the foamed current collector comprises carbon, nickel, titanium, aluminum, stainless steel, or a combination thereof.

16. A lithium ion battery comprising a positive electrode, a negative electrode, a separator between the positive electrode and the negative electrode, and an electrolyte comprising lithium ions,
wherein the negative electrode comprises metal and/or metal alloy/intermetallic particles, high surface area carbon particles, and lithium titanate particles having an average particle size of no more than 1 micron forming an electroactive negative electrode composite, and
wherein the positive electrode comprises an electroactive material having discharge capacity at a 10th discharge cycle of at least 240 mAh/g at room temperature at a discharge rate of C/3 when discharged from 4.6 volts to 2.0 volts.

17. The lithium ion battery of claim 16 wherein the metal alloy/intermetallic particles and the lithium titanate particles each have an average particle size of no more than 250 nm.

18. The lithium ion battery of claim 16 wherein the lithium titanate comprises from about 1 weight percent to about 45 weight percent relative to the combined weight of the metal alloy/intermetallic particles and the lithium titanate.

19. The lithium ion battery of claim 16 wherein the high surface area carbon particles have a Brunauer-Emmett-Teller (BET) surface area from about 255 to about 3500 m$^2$/g.

20. The lithium ion battery of claim 16 wherein the high surface area carbon particles comprise activated carbon, mesoporous carbon, or combination thereof.

21. The lithium ion battery of claim 16 wherein the metal and/or metal alloy/intermetallic particles comprise elemental silicon.

22. The lithium ion battery of claim 16 wherein the metal and/or metal alloy/intermetallic particles comprises a tin-copper alloy or an alloy of copper, tin and one or more additional metals, tin, or combination thereof.

23. The lithium ion battery of claim 16 wherein the metal alloy/intermetallic particles comprises a composition having a formula $Si_xSn_qM_yC_z$, where $(q+x)>2y+z$, $q>=0$, $z>=0$ and M is a metal selected from manganese, molybdenum, niobium, tungsten, tantalum, iron, copper, titanium, vanadium, chromium, nickel, cobalt, zirconium, yttrium and combinations thereof having at least about 40 weight percent and about 80 atomic percent Si as an amorphous Si phase, a nanocrystalline metal silicide phase, a silicon carbide phase when z>0, and an amorphous Sn phase when q>0.

24. The lithium ion battery of claim 16 wherein the metal alloy/intermetallic particles comprises a composition having a formula Sn-E-M, where E is boron (B), carbon (C), aluminum (Al), phosphorous (P) or a combination thereof ranging from 9.8 weight percent to 49 weight percent, and M is a metal selected from silicon, magnesium, titanium, vanadium, chromium, manganese, iron, cobalt, nickel, copper, zinc, gallium, zirconium, niobium, molybdenum, silver, indium, cerium, hafnium, tantalum, tungsten, bismuth and combinations thereof.

25. The lithium ion battery of claim 16 wherein the electroactive material of the positive electrode has a $10^{th}$ cycle specific discharge capacity of at least 235 mAh/g at room temperature and a tap density of at least 1.8 g/mL, wherein the specific discharge capacity is determined at a discharge rate of C/3 when discharged from 4.6 volts to 2.0 volts.

26. The lithium ion battery of claim 16 wherein the negative electrode further comprises a foamed current collector impregnating the electroactive negative electrode composite and lacks a foil current collector or a grid current collector separate from the foamed current collector, wherein the foamed current collector comprises carbon, nickel, titanium, aluminum, stainless steel, or a combination thereof.

* * * * *